Sept. 13, 1960

H. Z. GORA 2,952,035

APPARATUS FOR APPLYING GASKETS TO CLOSURE CAPS

Filed Oct. 16, 1953

INVENTOR.
Henry Z. Gora
BY
Johnson and Kline
ATTORNEYS

Sept. 13, 1960 H. Z. GORA 2,952,035
APPARATUS FOR APPLYING GASKETS TO CLOSURE CAPS
Filed Oct. 16, 1953 6 Sheets-Sheet 5

INVENTOR
Henry Z. Gora
BY Johnson and Kline
ATTORNEYS

United States Patent Office 2,952,035
Patented Sept. 13, 1960

2,952,035
APPARATUS FOR APPLYING GASKETS TO CLOSURE CAPS

Henry Z. Gora, Stratford, Conn., assignor, by mesne assignments, to Anchor Hocking Glass Corporation, Lancaster, Ohio, a corporation of Delaware Filed Oct. 16, 1953, Ser. No. 386,453

9 Claims. (Cl. 18—20)

This invention relates to the manufacture of closure caps for containers and more particularly to the production of caps having resilient gasket material on their container-engaging inner sides.

Such caps are used to close the mouths of bottles, jars and cans so as to seal the same against the escape of the material contained, and usually must make a gas-tight and liquid-tight connection with the adjacent surface of the container.

According to my invention, this is accomplished by applying and adhesively attaching to the inner side or surface of the cap a gasket of resilient material such as natural or artificial rubber, or plastic compounds, which is molded to the desired shape, size and thickness for the particular purpose for which it is used. Such caps are provided with gasket material by a continuous and economical process, avoiding waste of material and excessive use of material. Further, since the methods may be carried out continuously, automatically and rapidly, savings are effected in labor and time, and in capital investment in machinery and plant.

As disclosed in my copending applications Serial Nos. 89,088, now Patent Number 2,657,426 issued November 3, 1955, and 187,394, now Patent Number 2,745,135 issued May 15, 1956, showing several embodiments of my invention of which the present application discloses another embodiment, these savings and advantages are obtained by working the molding material in a mill, taking a strip therefrom, passing it between dies to blank out slugs while leaving the strip continuous and the slugs in the dies, opening the dies to release the strip, and guiding the strip back to the mill to be worked-in with the material thereon. As disclosed in my application Serial No. 187,394, now Patent Number 2,745,135 issued May 15, 1956, while the slugs are in the open dies, the caps are placed under the slug-carrying dies and the slugs are deposited on the caps, the caps are then transferred to molding dies and the latter are operated to mold the gasket to the desired shape, size and thickness. When this has been done the gasket-containing caps are discharged from the molds and subjected to further treatment under thermally controlled conditions if the material requires it.

These steps are carried out at the same time on successive caps and successives parts of the molding strip. While the slug are being formed the caps are being positioned, other caps are receiving the slugs, slug-carrying caps are being transferred to the molding dies, other caps on the molding dies are being molded, and molded caps are being discharged. While this is going on, the warmed strip of molding material is traveling from the mill, through the blanking dies and the blanked-out strip is returning to the mill.

In the embodiments of my invention disclosed in application Serial No. 187,394, now Patent Number 2,745,135 issued May 15, 1956, a cap is provided with a gasket of a top and side sealed type and the gasket blank is an annulus and covers only the overhanging flange and adjacent portion of the cap.

In the embodiments of my invention disclosed and claimed herein, the cap is of the crown type and the gasket blank is a disk which is molded to cover the entire underside of the cap between the skirt portion thereof.

The apparatus for carrying out the above method steps may be entirely manually controlled to perform the various steps in proper order, or it may be partially, but preferably is automtically operated so that the steps are carried out without attention or effort on the part of an operator except to see that the apparatus is functioning properly.

The apparatus illustrated and described herein comprises a suitable framework supporting a mill, and two rotatable drums each carrying a circular series of pairs of relatively movable dies, one drum carrying the slug-blanking dies and the other the gasket molding dies. Suitable power operated means may be provided for driving the mill and the drums. The apparatus also includes suitable cams for operating the dies as they rotate to perform the following functions in the order given: opening the dies to permit the warm strip of molding material to enter between them, closing the dies to blank out a determinate quantity of the strip, opening the dies and separating the strip from the dies while retaining the slug within the dies, moving the cap in position between the open dies, closing the dies and transferring the slug from the die to the cap, transferring the slug-carrying cap from the blanking drum to the molding drum, closing the dies on the cap-carrying slug to mold the gasket, opening the dies after the molding operation, and discharging the molded caps from the molding drum.

When the gasket material is of a type requiring further treatment under thermally controlled conditions, the apparatus also includes a treating tunnel and a conveyer for carrying the gasket lined caps discharged from the molding dies through the treating tunnel.

The method and apparatus of the present invention is characterized by other specific aspects and details which will be more fully referred to below.

In practicing the methods by which the savings and advantages above referred to are obtained by my invention, a continuously maintained quantity of moldable gasket material is warmed in a mill and from the mill is taken a narrow, continuous strip of molding material of determinate width and thickness which has been warmed by the mill in preparation for subsequent operations. The strip is guided from the mill and into the space between a circular series of pairs of open, continuously-traveling blanking dies which are operated as the dies travel to blank a succession of slugs from the strip and leave the strip otherwise continuous. Then the dies are opened, leaving the slug retained in one of the dies of each pair, and freeing the strip which is then guided out of the path of the blanking dies and returned to the warming mill where it is reworked with the material present in the mill. The quantity of material in the mill is maintained by adding fresh material.

At the same time that the strip is passing between the blanking dies and the slugs are being formed, crown caps from a continuous succession are, with their inner surfaces upward, fed one at a time to a plate traveling with the blanking dies but out of range of the dies and the strip. After the strip has passed from between the blanking dies and while the slug is being retained in one die of each pair, each cap is moved between a pair of dies which are operated to deposit the slug on the upwardly-facing surface of the cap.

When, as is frequent, the gasket material is essentially thermoplastic, the dies and the cap-carrying plate are heated so that they will be better suited for the molding operation.

The slug-carrying caps are carried to a position in which they are engaged by a transfer device and caused to move between a circular series of pairs of open continuously-traveling molding dies. When the caps are positioned between such dies, the dies are closed on the cap and gasket material under sufficient pressure to mold the gasket to the desired shape, size and thickness. The molding dies which may also be heated, if the molding material is thermoplastic, are held closed for a determinate time to set or partially cure the gasket material, after which the molding dies are opened and the caps with the molded gaskets are discharged from the dies.

If the gasket material is of a type requiring further treatment under temperature-controlled conditions, as for instance further heating to cure or vulcanize the material, the succession of caps leaving the apparatus may be passed onto a belt traveling through a tunnel under temperature-controlled conditions to supply the final operations.

Since the gaskets for crown caps extend, according to the present invention, over the entire inner surfaces of the caps (but not on the skirt portion), the material removed from the strip is a disk of just the correct volume to form the gasket.

Figures 1, 2:
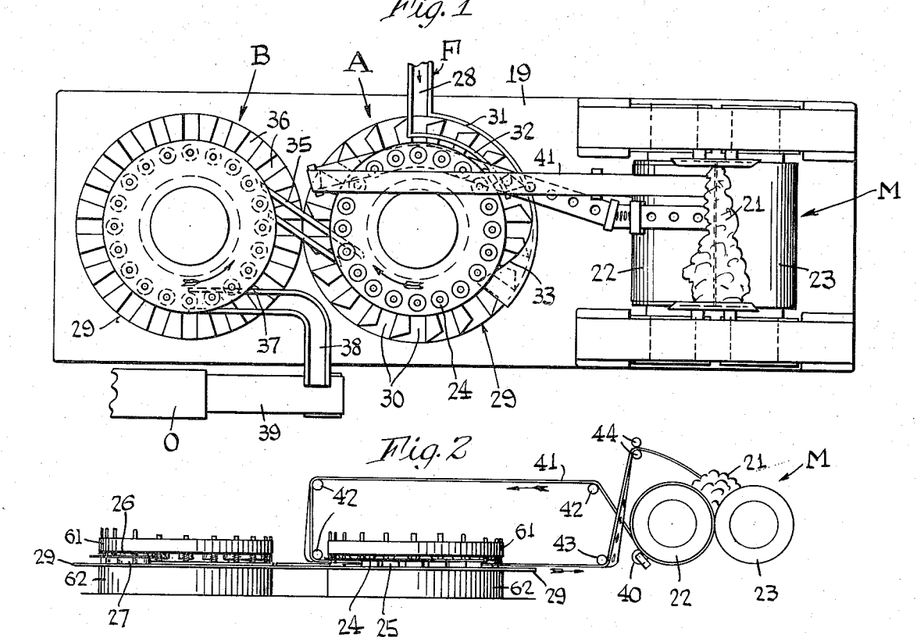
Figure 1 is a diagrammatic plan view showing the main parts of the apparatus of the present invention.
Fig. 2 is a similar view looking from the side.
Figure 12:
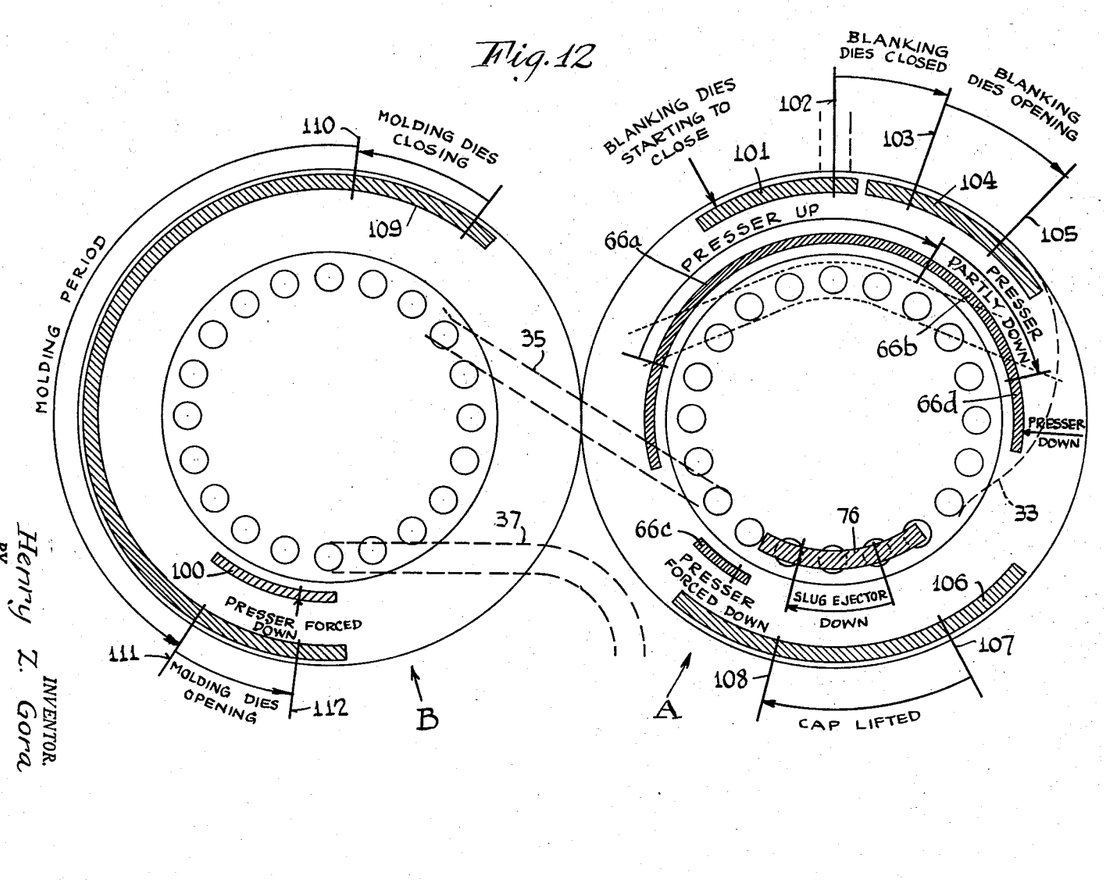
Fig. 12 is a diagrammatic view indicating the cams for operating the various parts of the apparatus and the places in the rotation of the drums at which the operations take place.

The apparatus by which the method of the present invention may be most expeditiously carried out is illustrated in Figs. 1, 2 and 12 diagrammatically. It comprises, in addition to a suitable frame or supporting structure 19, a warming mill M having mill rollers 22 and 23, a blanking drum A carrying a circular series of axially aligned blanking die members 24 and 25 which may be opened and closed automatically as the drum rotates, and a drum B carrying a circular series of axially aligned molding die members 26 and 27 which also are opened and closed automatically as the drum rotates. The apparatus also includes a cap feed device F including a chute 28 from which the caps C are deposited one at a time, inner side up, on a plate 29 in radial grooves 30 on the drum A with which the caps travel under the control of guides 31 and 32 until they are moved by a cam 33 into the space between the open cooperating die members 24 and 25 to receive a slug 34 of material from which the gasket is to be molded. The slug-carrying caps C continue traveling with the drum A until they are engaged by a cam 35 which causes them to move radially outwardly along the grooves 30 and be transferred to grooves 36 in the plate 29 of the drum B and between the cooperating die members 26 and 27 which are brought together and held under pressure to mold the slug and form the gasket thereon, as the drum B rotates. When caps C' with the molded gaskets reach the discharge station they are engaged by a cam 37 which moves them outwardly along their grooves 36 onto a chute 38 from which they may be collected for further treatment under temperature controlled conditions if required. When the gasket material is of a type requiring vulcanization, the caps C' may drop from the chute 38 onto a conveyer 39 and on the latter pass through a curing oven O.

From a bank of material 21 between the mill rollers 22 and 23, a layer of moldable gasket material is built on the roller 22 and from this layer there is cut by knives 40 a continuous strip 41 of warmed gasket material which is slightly wider than necessary to form the slug 34 and of the desired thickness. The strip 41 is guided away from the mill horizontally, over guide rollers 42, then downwardly, and then in a reverse direction horizontally so that it enters in the space between cooperating blanking die members 24 and 25 which close upon the strip and remove therefrom the slug 34 having an amount of molding material sufficient to form the gasket. The strip 41 follows the path of the die members 24 and 25 because several members 24—25 are in simultaneous engagement with it and cause it to travel with the dies and drum A for a short distance. As will be explained in more detail below, when the die members 24 and 25 open, the slug 34 is retained by the die member 24 and the strip is allowed to pass from between the die members and be guided by a roller 43 and feed rollers 44 back to the mill M to commingle with the bank 21 thereon and be reused to form the strip. After the strip is removed from between the die members 24 and 25, the naked caps which are carried by the plate 29 are moved successively as they pass a given point into the space between the die members 24 and 25 by the cam 33 and the slug 34 is then transferred from the die member 24 to the inner surface of the cap C. The slug adheres to the cap due to the tackiness of the material while the cap is transferred to the molding die members 26 and 27.

Figure 3:
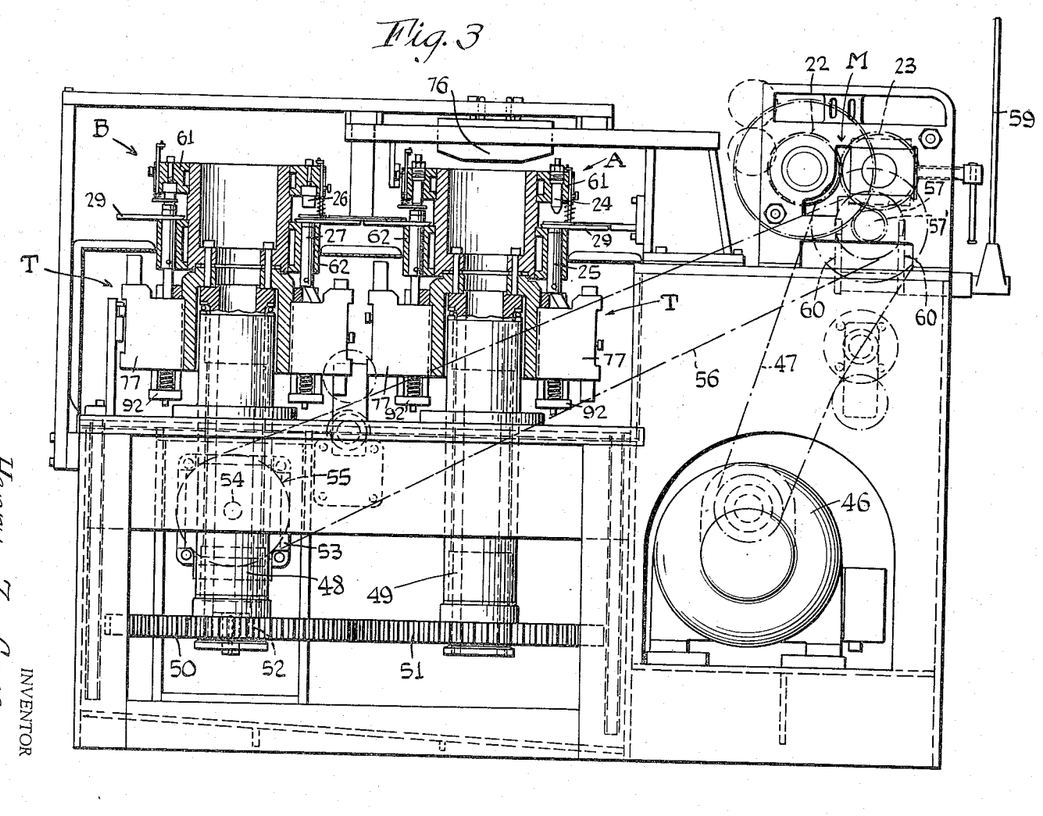
Fig. 3 is a view of the apparatus of the present invention showing some of the parts in vertical section.
Figure 4:
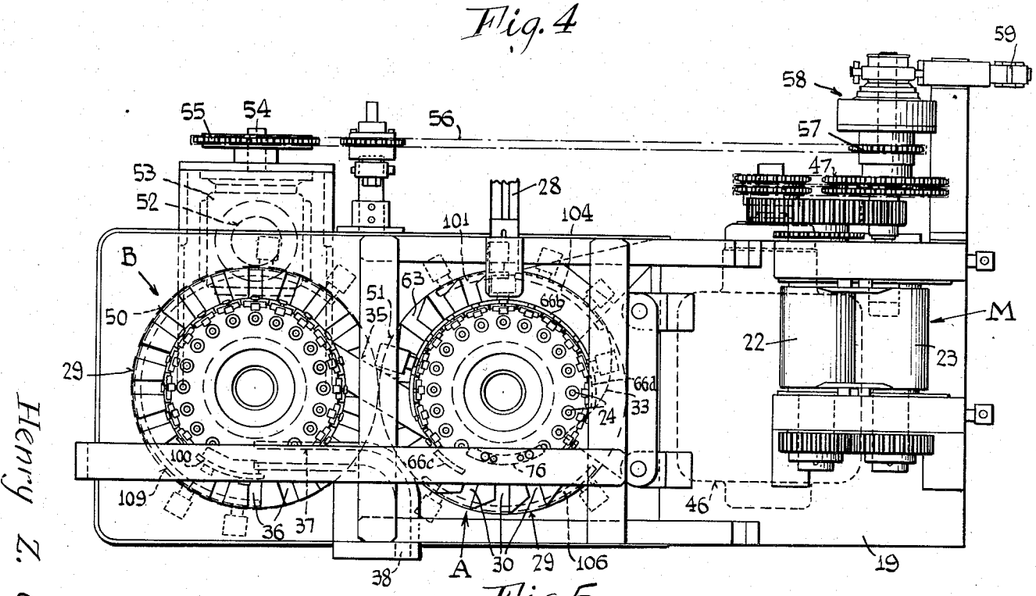
Fig. 4 is a plan view of the apparatus of the present invention.
Figure 5:
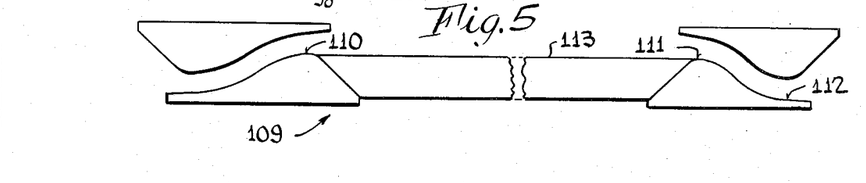
Fig. 5 is a schematic view showing the cam for operating the molding dies.

Preferably the mill operates continuously and the drums A and B continuously rotate, thus producing a continuous succession of caps on the underside of each of which is molded a gasket, the parts being driven by an electric or other type of motor 46, and chain or other connections 47 as shown in Figs. 3 and 4.

The rotatable drums A and B are fixed to vertical shaft 48 and 49 (see Fig. 3), and have respectively gears 50 and 51 which are in mesh so that the drums move in coordination and in opposite directions. The gear 50 is driven by a pinion 52 from a reduction gear box 53 driven by a shaft 54 having a sprocket 55 driven by a chain 56 connected to a sprocket 57 on a shaft 57' driven by the chain 47. A clutch 58 (see Fig. 4) connects the sprocket 57 and the shaft 57' so that when the clutch is open the motor can operate the mill rollers without rotating the drums to initially warm up the material on the mill. The clutch 58 is operated by a lever 59 having arms 60 and located at a convenient operating point.

The blanking drum A and the molding drum B are for the most part alike. Each has an upper flange 61 and a lower flange 62 secured to it, and these flanges have aligned bores arcuately spaced around them as shown in Fig. 4. The lower flanges 62 carry the cap-guiding tables 29 which, as stated above, have cap-guiding grooves 30. The cap-guiding grooves 30 on the drum A have enlarged entrance portions 63 so that the caps can enter the grooves 30 from the relatively stationary chute 28 while the drum A is rotating.

Figures 6, 7, 8:
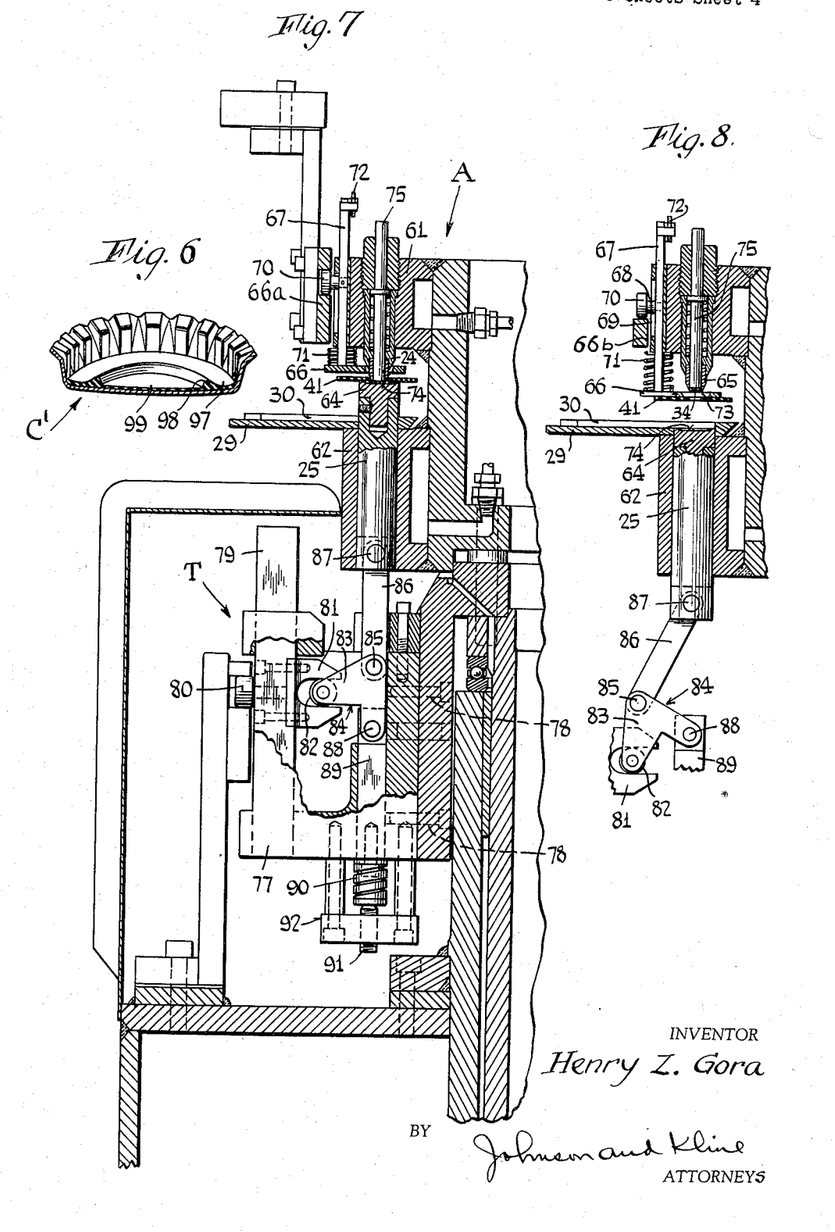
Fig. 6 is a perspective view showing half of a cap on which the gasket is lined.
Fig. 7 is a view partly in section and partly in elevation showing the blanking drum, the blanking dies, and the toggle mechanism for operating the same, the parts being shown in position with the dies closed.
Fig. 8 is a fragmentary view showing the blanking dies in open position.
Figures 10, 11:
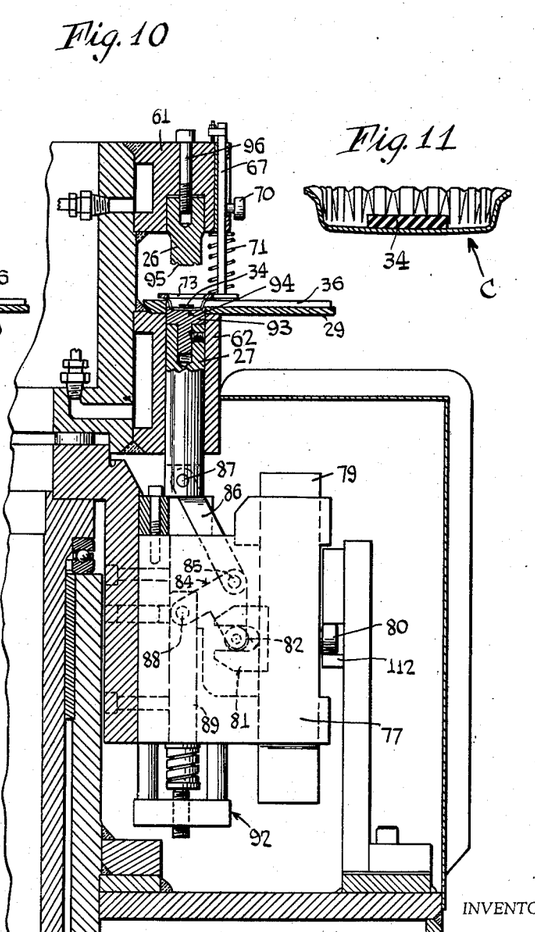
Fig. 10 is a view similar to Fig. 7 but showing the molding drum and parts associated therewith, the dies being shown in open position.
Fig. 11 is a sectional view taken through a slug-carrying cap.

In the form of the invention herein disclosed, the die members 25 and 27, as shown in Figs. 7 and 10, are movably mounted in the flanges 62, while the die members 24 and 26 are held in the flanges 61 against axial movement. Each die member 25 is in the form of a plunger and has mounted on its end a die head 64, and each die member 24 carries a hollow blanking head 65 located above the die head 64, so that when the latter is raised while the strip 41 of moldable material is above it, it will carry the strip against the blanking head 65 and cause a slug 34 of the material to be removed from the strip 41. When the die member 25 descends, the slug 34 is retained in the hollow blanking die 65 as shown in Fig. 8 and this slug is, as explained above, later transferred to a cap.

Associated with each of the die members 24 and 26 is a presser plate 66 mounted on a rod 67 slidably mounted on the upper flange of the drum. The rod 67 has a pin 68 connected therewith, extending through a slot 69 and having at its end a roller 70. The presser plate is provided with a spring 71 which urges it downwardly to a position controlled by an adjustment screw 72. Before the blanking die 64 rises, its associated presser plate has been raised by engagement with a cam 66a to a position above the end of the blanking die 65, the presser plate 66 having an aperture 73 through which the blanking die extends. When the die member 25 descends to free the strip 41, the presser plate 66 operated by a cam 66b pushes the strip 41 off the die 65 to release the strip therefrom. The spring 71 may be made sufficiently strong to cause this downward movement of the presser plate but, for more positive action, the operation is preferably performed by the cam 66b which engages the roller 70. The cam 66b holds the presser plate partially depressed as shown in Fig. 8 so that it will not interfere with the movement of the strip 41 in passing out from between the die members.

The die head 64 is provided with a cavity 74 at its upper end which slidably receives and fits the cap when the cap is slid by the cam 33 along the groove 30, the top of the die head 64 being substantially flush with the upper surface of the table 29 in its depressed position at the time that the cap is moved onto and nested in the die head.

The die member 24 has a spring-returned ejector pin 75 which projects above the flange 61 and is operated by a cam 76 at the proper time and location to force the slug 34 from the hollow blanking head 65. As will be pointed out below, this occurs at a time when the naked cap is raised by the die 64 to bring it into position to receive the slug.

The die members 25 and 27 are each moved to die-opening and closing positions by a toggle mechanism T illustrated in Figs. 7 and 10. There is one such toggle mechanism for each of the movable die members and they are secured to their respective drums so as to project radially therefrom. As shown in Figs. 7 and 10, the toggle mechanism comprises a frame 77 secured to the drum by screws 78. Guided within the frame there is a slide bar 79 carrying a roller 80 which is engaged by various cams controlling the movements of the die members. Secured to the slide bar is an operating fork 81 which engages a roller 82 on an arm 83 of a toggle link 84 and forming with the latter a bell crank. The link 84 has a pivot pin 85 connecting it with one end of a companion toggle link 86 whose other end is connected by a wrist pin 87 to the die member 25. The other end of the toggle link 84 is connected by a pin 88 to an abutment bar 89 mounted in the frame 77.

Figure 9:
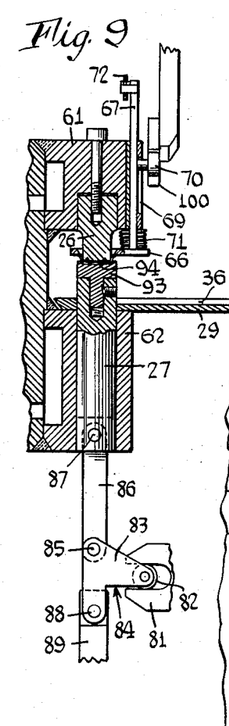
Fig. 9 is a fragmentary view of the molding dies showing the dies in closed position.

When the dies are fully opened, the members 25 and 27 are in the position shown in Figs. 8 and 10 in which the toggle is collapsed, the pin 85 being out of line with the pins 87 and 88. When, however, the dies are to be closed, the fork 81 moves the bell crank, of which the toggle link 84 is a part, upwardly causing the toggle links 84 and 86 to be extended, and this results in moving the die members upwardly to perform their operations. The cams operating the slide bars 79 may be so arranged as to bring the pivot pins 85, 87 and 88 into line and slightly beyond, as shown in Figs. 7 and 9, and thus lock the toggle against closing until the bell crank is moved in the opposite direction to unlock the toggle. Thus, in the case of the molding die members 27, once the toggles are locked with a slug-carrying cap between the dies there is no need of continuing the engagement between the roller 80 and the cam until such time as the dies are to be opened, and the friction and work which would otherwise be involved in keeping the dies closed under pressure is avoided.

To obtain controllable pressure and follow-up pressure the material between the die members, which are important considerations particularly in the operation of molding a gasket on the cap, the abutment 89 carrying the pivot pin 88 is slidably mounted in the toggle frame 77 and has its end in engagement with a spring 90, the other end of which is engaged by a screw 91 carried by a bracket 92 suspended from the toggle frame 77. Should the upward movement of the die member 25 or 27 meet with abnormal resistance, the abutment bar 89 may yield and compress the spring 90. When the resistance ceases, the spring 90 will move the abutment 89 upwardly and this will carry toggle links 84 and 86 and the connected die member upwardly against the material between it and the relatively stationary member. This upward movement of the toggle links 84 and 86 is not interfered with by the fork 81 because the movements are so slight that they may be compensated for by the slight rocking of the bell crank of which the link 84 is a part. The pressure exerted by the spring 90 may be varied by adjusting the screw 91.

The parts may be so adjusted and arranged that when the die members are brought to their intended closed positions, the abutment 89 normally yields slightly, thereby maintaining the dies closed under pressure determined by the adjustment of the spring 90.

In addition to controlling the pressure between the dies, the abutment 89, because of its yielding action, also prevents damage being done to the parts should a cap become improperly seated on the movable die or should a foreign element inadvertently become lodged between the dies.

Referring to the molding die members 26 and 27 in Fig. 10, the movable member 27 is in the form of a plunger and carries on its end a die 93 having a cavity 94 to slidably receive and nest a slug-carrying cap, while the die member 26 carries a molding die 95 held in place by a screw 96. The end of the die 95 is shaped to form a gasket of desired contour, for instance that shown in Fig. 6, which has an annular ring 97, a sealing ridge 98 and a central diaphragm-like cap-covering portion 99.

When the slug-carrying cap is placed on the die 93, the die member 27 is raised by a suitable cam to lock the toggle T and hold the cap and gasket material under pressure as shown in Fig. 9. During this movement of the die 93, the presser plate 66, by the action of its spring 71, holds the cap securely in position on the die 93. After the molding operation has been completed, the die 93 descends and the presser plate pushes the gasketed cap C' off the die 95 and returns it to the approximate level of the plate 29 so that the cap C' can be moved radially off the plate 29 by the cam 37.

To insure positive movement of the presser plate with the descending die 93, a cam 100 is located in position to engage and positively move the roller 70 of the presser plate so that the latter positions the cap to be received by the cam 37. Likewise, a cam 66c adjacent the blanking drum A positively assures that the slug-carrying cap C is in proper position to be engaged by the transfer cam 35.

Fig. 12 shows diagrammatically the location of the several cams for operating the toggles, for controlling the presser plate, for operating the ejector, and for controlling the movements of the caps as the drums rotate. Referring to the blanking operations, the strip 41 of moldable material follows the path indicated in dot-and-dash lines in entering between and leaving the die members. While the strip is between the dies, a cam 101 causes the die member 25 to be raised so that the strip is carried against the blanking die 65. When a high point 102 on the cam is reached, the dies are closed and remain closed until a high point 103 on the cam 104 is reached during which time the strip is cut through to form the slug 34 and the strip 41 is impaled on the dies to travel therewith. When a low point 105 on the cam 104 is reached, the dies are fully opened, thus permitting the strip 41 to pass out from between the dies. Before the strip 41 enters between the dies, the cam 66a engages the roller 70 of the presser plate and raises it out of the way. However, after the dies are closed and while they are opening, the roller 70 reaches a cam portion 66b which moves the presser plate down far enough to push the strip 41 off the blanking die 65 but not far enough to interfere with the passage of the strip from between the dies. After the dies are fully open, the roller 70 is engaged by a cam 66d which insures the completion of the downward movement of the presser plate where it remains due to the action of its spring 71.

During this operation of the dies and presser plate, the caps have been deposited on the plate 29, and after the dies are open and the presser plate is fully depressed, the cam 33 positions the caps on the dies 64. After this has occurred, the roller 80 on the toggle engages a cam 106 which raises the cap-carrying die 64 so that the cap is adjacent the blanking die 65 during the travel of the roller from the high point 107 to the high point 108 of the cam 106. At the same time the cam 76 operates the ejector 75 to push the slug 34 from the hollow blanking die and onto the facing surface of the cap. When this has been done, the cam 106 allows the die member 25 to descend to bring the cap to approximately the level of the table 29, the pressure plate 66 following down and holding the cap against the die 64. To assure such movement of the pressure plate, a cam 66c is provided, as above explained, in position to be operative while the cam 106 is permitting the die member to descend.

As the drum A continues to rotate the caps are engaged by the cam 35 and are transferred to the drum B where the roller 80 of the toggle engages a cam 109 until a high point 110 on the cam is reached which causes the molding dies to be closed and to stay closed, due to the fact that the toggle is locked, for a substantial part of the revolution of the drum until a point 111 on the cam 109 is reached when the molding dies start to open, being fully open when the roller reaches a point 112.

When there is a slug-carrying cap on the die 93, the toggle T, due to the pressure being maintained on the parts, will be held in its dead center position, or beyond, even after the roller passes the point 110 on the cam and until the roller reaches the point 111. However, when there is no slug-carrying cap on the die 93, such pressure is lacking and vibration, the weight of the parts, or centrifugal force might cause the toggle to break and the die member 27 to drop down suddenly. To avoid this, the cam 109 is provided with a land 113 extending from the high point 110 to the descending point 111. To avoid friction between the rollers 80 and the cam while the toggle is locked under pressure, the land 113 may be at a slightly lower level than the high point 110.

While the die member 27 is descending between the points 111 and 112 of the cam 109, the cam 100 operates the presser plate to cause it to positively move downwardly to positively strip the molded gasket and its cap from the die 95 and cause the gasketed cap to descend with the die 93 to approximately the level of the plate 29. During all other times, the presser plates on the drum B are under the influence of their springs so that the presser plates may rise and descend with the die members 27.

While for purposes of explanation the operations have been described above as carrying one cap through the various steps, it should be understood, of course, that in the preferred form of my invention the various operations are carried out simultaneously. For instance, while the gasket is being blanked at one station and the caps are being fed to the machine, other caps are being transferred to slug-receiving position, other caps are being transferred from the blanking drum to the molding drum, the gaskets are being molded on other caps and finally other caps are being transferred to the discharge chute 38 and onto the belt 39 of the oven O if desired.

Variations and modifications may be made within the scope of the claims and portions of the improvements may be used without others.

I claim:

1. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; means for opening the dies, the slug being retained in the hollow die member; a plurality of presser plates, one for each pair of die members, mounted on said drum for movement in die opening and closing directions and each having an aperture through which the hollow die member extends; means for operating said presser plates to force the strip of moldable material off the hollow die members when the die members are open; means for feeding a plurality of caps onto said drum and positioning one cap between each pair of die members when open; and means for moving said presser plates to position to engage the rims of the cap and retain the caps in position between the die members as the drum rotates.

2. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; means for opening the dies, the slug being retained in the hollow die member; a plurality of presser plates, one for each pair of die members, mounted on said drum for movement in die opening and closing directions and each having an aperture through which the hollow die member extends; means for operating said presser plates to force the strip of moldable material off the hollow die members when the die members are open; means for feeding a plurality of caps onto said drum and positioning one cap between each pair of die members when open; means for moving said presser plates to position to engage the rims of the cap and retain the caps in position between the die members as the drum rotates; means for closing the die members to receive the blanked-out slugs on the caps supported by the die members; and means for yieldingly holding the presser plate against the cap in position between the dies during such movement.

3. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; means for opening the dies, the slug being retained in the hollow die member; a plurality of presser plates, one for each pair of die members, mounted on said drum for movement in die opening and closing directions and each having an aperture through which the hollow die member extends; means for operating said presser plates to force the strip of moldable material off the hollow die members when the die members are open; means for feeding a plurality of caps onto said drum and positioning one cap between each pair of die members when open; means for moving said presser plates to position to engage the rims of the cap and retain the caps in position between the die members as the drum rotates; means for closing the die members to receive the blanked-out slugs on the caps supported by the die members; means for yieldingly holding the presser plate against the cap in position between the dies during such movement; means for again opening the dies; means for removing the slug-carrying caps from between the open dies and discharging them from the drum; and means for positively moving each presser plate as the dies open to predetermined positione to assure the positioning of the slug-carrying cap for engagement by said removing and discharging means.

4. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; cams for opening the dies, the slug being retained in the hollow die member; a plurality of presser plates, one for each pair of die members, movably mounted on said drum for movement in die opening and closing directions, and each having an aperture through which the hollow die member extends; and a cam for operating said pressure plates to force the strip of moldable material off the hollow die members when the die members are open.

5. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; cams for opening the dies, the slug being retained in the hollow die member; a plurality of presser plates, one for each pair of die members, movably mounted on said drum for movement in die opening and closing directions, and each having an aperture through which the hollow die member extends; a cam for operating said presser plates to force the strip of moldable material off the hollow die members when the die members are open; means for feeding a plurality of caps onto said drum including a cam for positioning one cap between each pair of die members when open; an a cam for moving said presser plates to position to engage the rims of the caps and retain them in position between the die members as the drum rotates.

6. Apparatus for molding and applying a gasket liner on the inside of container closure caps comprising a rotatable gasket blanking drum having a circular series of pairs of aligned opposed blanking die members relatively movable to open and closed positions, one member of each pair being hollow; means for moving said die members to closed position to penetrate a strip of moldable material and blank therefrom a slug; cams for opening the dies, the slug being retained in the hollow die member; a plurality of presser plates, one for each pair of die members, movably mounted on said drum for movement in die opening and closing directions, and each having an aperture through which the hollow die member extends; a cam for operating said presser plates to force the strip of moldable material off the hollow die members when the die members are open; means for feeding a plurality of caps onto said drum including a cam for positioning one cap between each pair of die members when open; a cam for moving said presser plates to position to engage the rims of the caps and retain them in position between the die members as the drum rotates; a cam for closing the die members to receive the blanked-out slugs on the caps supported by the die members; and a spring for yieldingly holding each presser plate against the cap in position between the dies during such movement.

7. Apparatus for molding and applying a gasket liner on the inside of container closure caps comprising a rotatable gasket blanking drum having a circular series of pairs of aligned opposed blanking die members relatively movable to open and closed positions, one die member of each pair being hollow; means for moving said die members to closed position to penetrate a strip of moldable material and blank therefrom a slug; cams for opening the dies, the slug being retained in the hollow die member; a plurality of pressure plates, one for each pair of die members, movably mounted on said drum for movement in die opening and closing directions, and each having an aperture through which the hollow die member extends; a cam for operating said pressure plates to force the strip of moldable material off the hollow die members when the die members are open; means for feeding a plurality of caps onto said drum including a cam for positioning one cap between each pair of die members when open; a cam for moving said presser plates to position to engage the rims of the caps and retain them in position between the die members as the drum rotates; a cam for closing the die members to receive the blanked-out slugs on the caps supported by the die members; a spring for yieldingly holding each presser plate against the cap in position between the dies during such movement; a cam for again opening the dies; a cam for removing the slug-carrying caps from between the open dies and discharging them from the drum; and a cam for positively moving each presser plate as the dies open to predetermined position to assure the positioning of the slug-carrying cap for engagement by said removing and discharging cam.

8. Apparatus for molding and applying a gasket liner on the inside of container closure caps comprising a rotatable gasket molding drum having a circular series of pairs of aligned opposed die members relatively movable to open and closed positions; means for positioning one slug-carrying cap between each pair of die members when open; means to move the die members to closed position to mold the slug to form a gasket on said cap; a plurality of pressure plates, one for each pair of die members, movably mounted on said drum for movement in die opening and closing directions, each pressure plate having an aperture through which one of the die members of each pair extends and being positioned to engage the rim of a cap supported on a die member; means yieldingly urging each pressure plate against the rim of a cap between its associated pair of die members; means for opening the die members when the molding operation has been completed; means discharging the caps with the molded gaskets from the drum when the die members are opened; and means positively moving the presser plate to position the cap to be engaged by said discharging means.

9. Apparatus for molding and applying a gasket liner on the inside of container closure caps comprising a rotatable gasket molding drum having a circular series of pairs of aligned opposed die members relatively movable to open and closed positions; a cam for positioning one slug-carrying cap between each pair of die members when open; a cam for moving the die members to closed position under pressure to mold the slug to form a gasket on said cap; a plurality of presser plates, one for each pair of die members, movably mounted on said drum for movement in die opening and closing directions, each presser plate having an aperture through which one of the die members of each pair extends and being positioned to engage the edge of a cap supported on a die member; a spring yieldingly urging each presser plate against the rim of the cap; a cam for opening the die members when the molding operation has been completed; a guide chute for discharging the caps with the molded gaskets from the drum when the die members are opened; and a cam for positively moving the presser plate to position the cap to be engaged by said guide chute.

References Cited in the file of this patent

UNITED STATES PATENTS

| | | |
|---|---|---|
| 448,748 | Comings | Mar. 24, 1891 |
| 891,642 | Tietzmann | June 23, 1908 |
| 1,053,898 | Bogdanffy | Feb. 18, 1913 |
| 1,492,510 | De Escobales | Apr. 29, 1924 |
| 1,711,978 | Wanders | May 7, 1929 |
| 2,058,880 | Hunt | Oct. 27, 1936 |
| 2,304,141 | Bergmann | Dec. 8, 1942 |
| 2,440,367 | Cropp | Apr. 27, 1948 |
| 2,516,908 | Pottle | Aug. 1, 1950 |
| 2,535,642 | Liebowitz | Dec. 26, 1950 |
| 2,548,303 | Gora | Apr. 10, 1951 |
| 2,548,304 | Gora | Apr. 10, 1951 |
| 2,548,305 | Gora | Apr. 10, 1951 |
| 2,593,439 | Gora | Apr. 22, 1952 |
| 2,654,914 | Maier | Oct. 13, 1953 |
| 2,657,426 | Gora | Nov. 3, 1953 |
| 2,728,946 | Pinsenschaum | Jan. 3, 1956 |